United States Patent
Goebel et al.

(10) Patent No.: US 9,005,830 B2
(45) Date of Patent: Apr. 14, 2015

(54) FREEZE START OPERATION IN A FUEL CELL WITH A BLOCKED ANODE CELL

(75) Inventors: Steven G. Goebel, Victor, NY (US); Matthew K. Hortop, Braunschweig (DE)

(73) Assignee: GM Global Technology Operations LLC, Detroit, MI (US)

( * ) Notice: Subject to any disclaimer, the term of this patent is extended or adjusted under 35 U.S.C. 154(b) by 1178 days.

(21) Appl. No.: 12/706,354

(22) Filed: Feb. 16, 2010

(65) Prior Publication Data

US 2010/0143813 A1    Jun. 10, 2010

(51) Int. Cl.
*H01M 8/04* (2006.01)
*H01M 8/10* (2006.01)

(52) U.S. Cl.
CPC ...... *H01M 8/04223* (2013.01); *H01M 8/04671* (2013.01); *H01M 8/04365* (2013.01); *H01M 8/04388* (2013.01); *H01M 8/04552* (2013.01); *H01M 8/04559* (2013.01); *H01M 2008/1095* (2013.01); *Y02E 60/50* (2013.01)

(58) Field of Classification Search
CPC ........................ H01M 8/0432–8/04365; H01M 8/04544–8/04559; H01M 8/04746–8/04761
USPC ........................................................ 429/429
See application file for complete search history.

(56) References Cited

U.S. PATENT DOCUMENTS

| | | | |
|---|---|---|---|
| 2003/0003335 A1* | 1/2003 | Kazama et al. | 429/23 |
| 2003/0162079 A1* | 8/2003 | Ooma et al. | 429/38 |
| 2005/0053809 A1* | 3/2005 | Hayashi et al. | 429/13 |
| 2006/0029847 A1 | 2/2006 | Yumita et al. | |
| 2006/0199053 A1* | 9/2006 | An et al. | 429/24 |
| 2008/0081225 A1 | 4/2008 | Arthur et al. | |
| 2008/0187804 A1 | 8/2008 | Arthur et al. | |
| 2010/0190075 A1 | 7/2010 | Frost et al. | |
| 2010/0196743 A1* | 8/2010 | Cho et al. | 429/3 |

FOREIGN PATENT DOCUMENTS

| | | |
|---|---|---|
| DE | 102004033169 A1 | 2/2005 |
| DE | 102007059999 A1 | 7/2008 |
| DE | 102009056034 A1 | 12/2010 |
| JP | 2008059977 A | 3/2008 |
| WO | WO 2007/075173 A1 * | 7/2007 ............. H01M 8/04 |

* cited by examiner

*Primary Examiner* — Maria J Laios
(74) *Attorney, Agent, or Firm* — Dinsmore & Shohl LLP

(57) ABSTRACT

Methods for starting a fuel cell system are provided. In one embodiment, the method includes providing hydrogen to an inlet of an anode of the fuel cell pressurizing the anode to a pressure; determining whether a blocked cell condition exists; if a blocked cell condition exists, if no blocked cell condition exists, initiating a normal start sequence, alternately reducing the pressure of the anode and increasing the pressure of the anode until an exit condition exists, the exit condition selected from a voltage of the fuel cell being stable, or a temperature of the fuel cell being greater than about 0° C., or both, and when the exit condition exists, initiating the normal start sequence.

17 Claims, 4 Drawing Sheets

FREEZE START OPERATION IN A FUEL CELL WITH A BLOCKED ANODE CELL

BACKGROUND

This invention relates generally to fuel cells, and more particularly to methods of fuel cell system start-up under frozen conditions with ice blocking an anode cell.

Starting a fuel cell system for automotive applications involves a balance between reliability, durability, and time until acceptable drive away (start length). Reliability involves ensuring that sufficient reactant is present across the whole active area on both sides of the membrane so that full current can be supported. This must be done without exceeding the hydrogen emission requirements. Factors such as hardware layout, hardware reliability, or various ambient conditions, such as temperature, pressure, and humidity, also impact the strategy used to start a fuel cell system successfully.

Under freeze start conditions, sometimes a cell is or becomes blocked with ice. If the anode is blocked, after consuming all of the hydrogen within the cell, the cell goes to negative voltages, even at low power. Another indication of a cell blockage is that even after the load is removed, it takes a long time to get back to the open circuit voltage (OCV), so the interpretation is that diffusion (or a very slow leak) is needed to get hydrogen back into the cell.

Therefore, there is a need for a reliable start-up method under freeze conditions.

SUMMARY OF THE INVENTION

The present invention meets that need. Methods for starting a fuel cell system are provided. In one embodiment, the method includes providing hydrogen to an inlet of an anode of the fuel cell pressurizing the anode to a pressure; determining whether a blocked cell condition exists; if no blocked cell condition exists, initiating a normal start sequence; if a blocked cell condition exists, alternately reducing the pressure of the anode and increasing the pressure of the anode until an exit condition exists, the exit condition selected from a voltage of the fuel cell being stable, or a temperature of the fuel cell is greater than about 0° C., or both, and when the exit condition exists, initiating the normal start sequence.

DETAILED DESCRIPTION OF THE INVENTION

Figure 1:
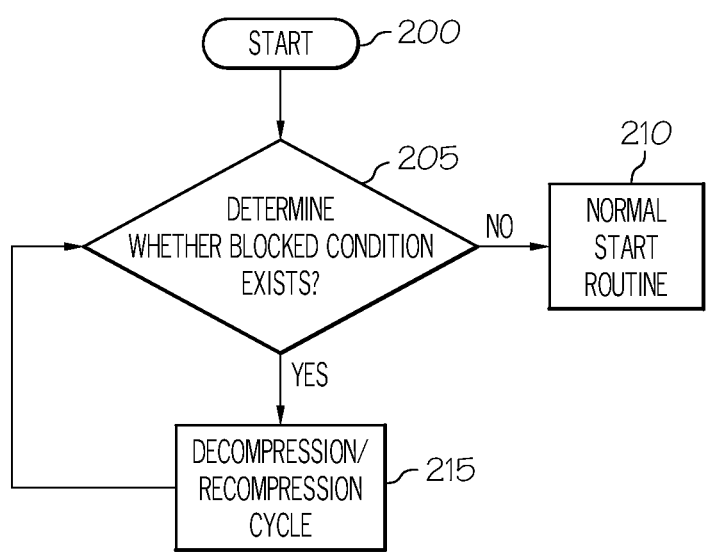
FIG. 1 is a flow chart illustrating one embodiment of the start method of the present invention.

A method of start up operation under a blocked anode condition which reduces or prevents failed starts is provided. The method allows improved efficiency with fewer or shorter freeze preparation purges. This results from more aggressive freeze prediction, which is permitted because of the remedial start method using anode pressure cycling. A freeze preparation purge is needed to dry out the stack for reliable freeze starts, but the purge requires significant operating time and energy. If freezing conditions are not predicted (for example, based on weather forecast or current temperatures), the freeze preparation purge may be skipped or reduced, thereby saving energy. However, the freeze prediction must be conservative in the absence of a remedial start method because an unpredicted freeze condition leading to a failed start is an unacceptable costumer inconvenience.

The start method can potentially reduce costs by allowing elimination of the cell voltage monitor. When a cell reversal occurs, the load must be dropped because a large negative voltage across the membrane will quickly lead to electrical shorts, which can damage the membrane and even melt plates. A cell voltage monitor is used to detect this situation in order to reduce or drop the load to protect the stack. Proper anode operation can avoid this starvation situation except under the condition of a cell blockage, for example, with ice. If desired, this pressure cycling mode of operation could be used for all freeze starts until the stack is above freezing to avoid this failure mode. This could potentially allow for the elimination of the cell voltage monitoring leading to a considerable cost savings.

The method uses gas compression/decompression cycles to force hydrogen into a cell with a blocked anode and to remove inert gas from the cell to allow limited operation. An anode bleed can be used to reduce the decompression time, if desired. During the decompression cycle, or the compression cycle, or both, the stack loads can be reduced or eliminated. If the stack load is eliminated, the compressor flow may be reduced. Temperature and voltage can be used alone or in combination to determine whether to use the pressure cycling mode of operation. For example, it can be entered upon detection of a starved cell, such as by a negative cell voltage when cell voltage monitoring is available, and it can be exited when the cell voltage has recovered. It can be used under cold stack conditions, and it can be exited to normal operation when the stack temperature is above freezing.

During startup, the anode is pressurized with hydrogen which compresses the gas initially within the anode volumes and the added hydrogen into all of the cells, even blocked ones. However, if the upstream volume of non-hydrogen gas is large, the added hydrogen may not reach the active area of a blocked cell. Because of this, it is desirable to keep the upstream volume (between the hydrogen injection and the stack active area) relatively small. As current is pulled from the stack, the hydrogen is consumed leaving only nitrogen in the blocked cell, and the blocked cell shuts down (e.g., goes to negative cell voltages as current is driven by the remaining cells with hydrogen). The fill with nitrogen will happen much faster when there is a recycled anode flow with nitrogen dilution in the feed stream. An estimate of 200 A-s for a 1 bar pressure increase with 20% nitrogen dilution might be expected before consumption of all hydrogen within a blocked cell.

The additional moles (not including the upstream gas which is compressed into the cell and may not contain any hydrogen), $N_{fill}$, to fill an anode cell to the new pressure is estimated to be:

$$N_{fill} = P_2(V_{cell} - (V_{up} + V_{cell})P_1/P_2)(RT)$$

where;

$P_1$ (kPa) is the initial pressure
$P_2$ (kPa) is the final pressure
T (K) is the temperature
$V_{up}$ (L) is the anode upstream (between the hydrogen injector and the active area) volume per cell
$V_{cell}$ (L) is the anode active area volume per cell
R (8.314 kPa L/(mole-K)) is the universal gas constant To increase the moles of hydrogen compressed into a blocked anode, it is desired that the final pressure be as large as allow by the system. This fill gas will eventually become nitrogen as the hydrogen within the active area is consumed. For an anode recycle system (such as a jet pump), the recycle gas could be considered as inert nitrogen. Depending on the system capability, reducing the recycle ratio (recycled gas to fresh hydrogen) or lowering the inert gas mole fraction of the recycle gas (such as by bleed during the start) will help to increase the hydrogen that can be supplied and used by a blocked cell. Using a fixed ratio of inert to total anode inlet flow, $X_{N2}$, the amount of hydrogen, $N_{H2}$, that is supplied with this amount of inert gas is:

$$N_{H2} = (1 - X_{N2})/X_{N2} N_{fill}$$

This can be converted to charge using Faraday's constant, F (96,487 A-s/e-mole):

$$\text{Charge (A-s)} = N_{H2} 2F$$

For a pressure rise from 101.3 to 202.6 kPa at 273K where the upstream and cell volumes are 0.002 and 0.008 L respectively, 0.00026 added moles are needed to fill the cell. For an inert gas fraction of 0.2, 0.001 moles of hydrogen are consumed which would provide about 200 A-s of charge before this hydrogen is gone and the cell would reverse due to the current being driven by the other cells in the stack.

In order to revive a blocked cell, the anode pressure is rapidly reduced to allow discharge by decompression of the nitrogen (or other non-hydrogen) gas back out the cell inlet. To maximize the moles of discharged gas with each pressure cycle, the pressure cycle should be as large as possible. The maximum pressure is limited by the mechanical integrity of the anode and the minimum pressure by the ability to discharge gas. The discharged gas would then flow out the open cells.

Under normal pressure control of the anode of a fuel cell system, the anode pressure follows the power level (or cathode pressure) of the stack with higher pressures at higher power levels. However, under the remedial freeze start operation in which hydrogen is compressed into and nitrogen is decompressed from a blocked cell, the anode pressure is quickly elevated to the maximum level and discharged to the lowest level as quickly as possible and not in connection with the power level. Under this remedial freeze start operation, the stack load would likely be reduced or eliminated (to avoid cell reversal) especially when the pressure is reduced.

Large pressure ratios are desired to fill the cell with hydrogen more completely or to discharge nitrogen from the cell. A typical pressure cycle range could be up to about 200 kPa or about 300 kPa and down to about 110 kPa or about 150 kPa, which is typical of the pressures utilized in normal operations. However, in the remedial freeze start operation, the pressure cycling will generally be done as quickly as the system permits. The pressure is generally increased in less than about 5 seconds, or less than about 2 seconds, and preferably about 0.5 seconds. The time is only limited by the injector flow capability and volume of the anode. The pressure decrease generally requires more time because the discharge valves are typically sized for their normal function of hydrogen to cathode heating and bleed. A time of less than about 10 seconds, or less than about 7 seconds, or less than about 5 seconds, to as low as about 2 seconds would be suitable for a time to decrease the anode pressure. The pressure cycling is done in response to a blocked cell condition, such as a low cell voltage or frozen stack conditions. Once a cell is recompressed with hydrogen, the amount of current draw can be determined based on the equations provided. That is, another pressure cycle (decrease and increase) is not needed until the allowed coulombs for the filled cell have been consumed.

The decompression could be accomplished by lowering the anode pressure set point and/or continuing to bleed to the cathode or opening the flush valve to proceed more quickly using bleed valves 50 and 52 or purge valve 66 in the system shown in FIG. 1, for example. In some systems, in order to reduce the number of valves, one valve may perform both bleed (discharging excess $N_2$ during normal run, typically a low flow rate) and flush (discharging a larger flow rate, typically for start). Directing this flow to the cathode inlet allows the elimination of a hydrogen to cathode valve. Injecting hydrogen to the cathode provides heating of the fuel cell by the catalytic reaction of hydrogen and air on the fuel cell catalysts.

The pressure can be decreased by opening an anode discharge valve, such as an anode bleed valve or an anode flush valve, which could be directed to the cathode inlet for catalytic heating.

During decompression, the cell's ability to carry a load will be further reduced. The load can be dropped during decompression, if desired. Alternatively, the load can be dropped for the duration of the recovery process (during decompression and compression).

Recompression will bring hydrogen back into the blocked cell. The pressure can be increased by opening the hydrogen supply valve, typically an injector. This can be accomplished by increasing the pressure set point which would lead the injector control to respond to meet the desired pressure.

The decompression/recompression cycle would be repeated until the blocked cell is cleared. The cell will generally be cleared by thawing from warmed coolant.

The order of decompression and compression does not matter. Increasing the pressure first should provide more hydrogen in the blocked cell to allow continued operation. This might permit continued operation until the blockage is thawed, or at least delay the time when the load has to be dropped when the pressure is decreased.

Figure 2:
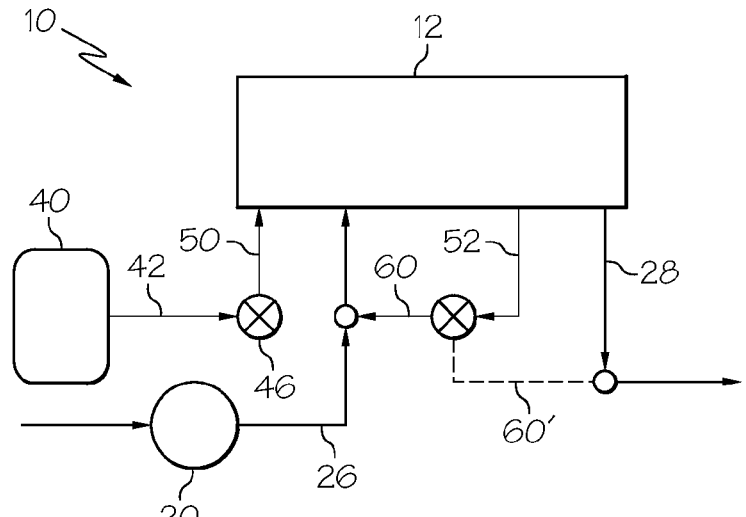
FIG. 2 is a schematic block diagram of one embodiment of a fuel cell system

The method is illustrated in FIG. 1. The start process is initiated at block 200. The system determines whether a blocked condition exists at decision block 205. If there is no blocked condition, the system continues with the normal start routine at block 210. If there is a blocked conditions, the system proceeds to the decompression/recompression cycling at block 215. The system then returns to block 205 to determine if the blocked condition still exists. If not, the normal start routine is entered at block 210. If the blocked condition still exists, the system returns to the decompression/recompression at block 215. This process is repeated until the blocked condition is cleared. The system can be set to perform a single decompression/recompression cycle before returning to determine whether the blocked condition continues to exist, or more than one cycle of decompression/recompression can be performed before returning, as desired. FIG. 2 illustrates a simplified fuel cell system 10 with the components necessary to implement the present invention to start a stack 12 with a blocked anode cell. A compressor 20 provides cathode input air on cathode input line 26 to the stack 12. Cathode exhaust gas is output from the stack 12 on cathode output line 28. Typically, a cathode humidification unit (not shown) will be provided at a suitable location in the cathode input line 26. An injector 46 injects hydrogen gas from a hydrogen supply line 42 from a hydrogen gas source 40 to the stack 12 anode supply line 50. Anode exhaust from stack 12 is provided by anode output line 52. To discharge excess gas from the anode such as nitrogen that has crossed over the membranes within the stack or air that has entered the stack while the fuel cell system is off, a discharge line 60 with a normally closed valve 62 is provided. The discharge line 60 may exhaust to the cathode input line 26, or the discharge line 60' may be routed to the cathode output line 28. The injector 46 is used to control the supply of hydrogen to and anode pressure within the stack 12 and the discharge valve 62 is used to discharge anode gas and to allow the anode pressure to be decreased.

Upon shutdown, the compressor 20 is stopped to discontinue the air flow. Hydrogen pressure is maintained in the stack 12 by operating the injector 46 to preferably consume oxygen within the stack for shutdown. The anode valve would remain closed during off-time. For startup, the injector 46 provides hydrogen to the stack 12 and the discharge valve 62 is opened to allow discharge of non-hydrogen gas from the anode of the stack 12. By directing the anode discharge 60 to the cathode inlet line 26, hydrogen discharged from the anode provides heating within the stack 12 by catalytic reaction with air on the cathode catalyst to assist with cold starting of the fuel cell system 10. The amount of hydrogen that is needed at startup to purge the stack 12 can be calculated based on the volume of the anode side of the stack 12, the temperature of the stack 12, and the pressure within the stack 12. The hydrogen flow into the stack 12 should be roughly one anode volume. If an insufficient amount of hydrogen flows into the stack or a cell, some of the fuel cells might be left containing an $H_2/O_2$ front. The loop volume for the stack 12 is calculated and this information is combined with the hydrogen flow rate during the start-up to determine the purge time.

Figure 3:
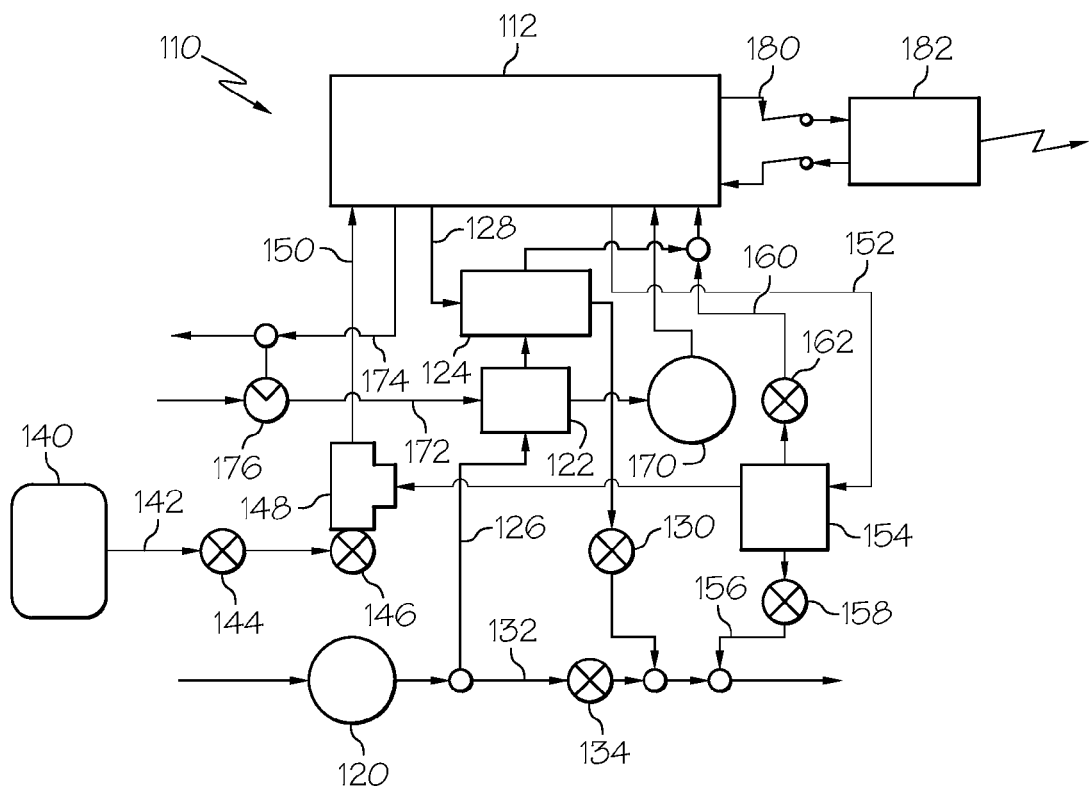
FIG. 3 is a schematic block diagram of one embodiment implementing the start method of the present invention.

Most fuel cell systems have additional components to meet additional functional requirements such as illustrated by fuel cell system 110 in FIG. 3 where similar parts are numbered 1xx. A compressor 120 provides cathode input air on cathode input line 126 to the stack 112 after passing through a charge air cooler 22 to control the air temperature and water vapor transfer unit 24 to humidify the air before entering the stack 112. Cathode exhaust gas is output from the stack 112 on cathode output line 128. The cathode exhaust provides a humid stream for the water vapor transfer unit 124. A normally closed back-pressure valve 130 is used to control the cathode pressure. For compressor surge control as well as start dilution, a cathode bypass line 132 with a normally open bypass valve 134 is used. An injector 146 injects hydrogen gas from a hydrogen supply line 142 from a hydrogen gas source 140 to the stack 112 anode supply line 150. The hydrogen supply line 142 typically has an isolation valve 144 to ensure positive shut-off of the hydrogen supply 140. For stable operation of the stack 112, additional hydrogen flow is desired which can be provided without excess by recycling of the anode gas. A jet pump 148 driven by the high pressure supply hydrogen is a low cost means of providing this anode recycle. Anode exhaust from stack 112 is provided by anode output line 152. To discharge excess gas from the anode such nitrogen that has crossed over the membranes within the stack or air that has entered the stack while the fuel cell system is off, a discharge line 160 with a normally closed valve 162 is provided. The discharge line 160 exhausts to the cathode input line 126 to provide hydrogen to the cathode for catalytic heating of the stack 112 for cold starts. The anode outlet stream may contain liquid water which is separated from the gas flow in separator 154. The collected water is drained from the separator 154 through drain line 158 to the exhaust by opening the normally closed drain valve 158. The gas in the anode output line 152 is directed back to the jet pump 148 to be recycled through the stack 112. The injector 146 is used to control the supply of hydrogen to and anode pressure within the stack 112. The discharge valve 162 is used to discharge anode gas and to allow the anode pressure to be decreased. To control the temperature of the stack 112, a coolant system is used including a coolant inlet line 172 and discharged to a radiator on coolant outlet line 174. The coolant flow is driven by a coolant pump 170, and a 3-way valve 176 between the coolant inlet 172 and outlet line 174 is used to regulate the temperature of the coolant. The electrical power from the stack 112 can be connected for operation or disconnected for periods of non-use with contactors 180. A DC/DC boost 182 is used to raise the voltage from the stack 112 to a level desired by the tractions system. Many other system embodiments are possible.

During normal operation, the stack 112 generates current which is used to drive system loads. It is necessary to bleed the anode side of the stack 112 periodically to remove nitrogen that may otherwise dilute the hydrogen and affect cell performance. Normally closed bleed valve 162 is provided for this purpose. When an anode bleed is commanded, the bleed valve 162 is opened, and the bled anode exhaust gas is sent to the cathode inlet line 126.

Upon shutdown, the compressor 120 is stopped to discontinue the air flow. The current to discharge the stack 112 can be used to charge a battery in the system or be dissipated in a resistor. Hydrogen pressure is maintained in the stack 112 by operating the injector 146 to preferably consume oxygen within the stack for shutdown. Once the oxygen has been consumed from the stack 112, the hydrogen flow is turned off, and the discharge valve 162 is closed to seal the anode side of the stack 112. When the system 110 is shut-down in this manner, the stack 112 includes an $N_2/H_2$ mixture in both the cathode side and the anode side. Over time, air will leak into the stack 112, and the hydrogen in the stack 112 will initially consume the oxygen. Additionally, the hydrogen will slowly leak out of the stack 112. As a result, the composition of the gases within the stack 112 will vary over time between a hydrogen rich mixture in nitrogen and water to an air mixture. The anode discharge valve 162 would remain closed during off-time.

For startup, the injector 146 provides hydrogen to the stack 112, and the discharge valve 162 is opened to allow discharge of non-hydrogen gas from the anode of the stack 112. By directing the anode discharge 160 to the cathode inlet line 126, hydrogen discharged from the anode provides heating within the stack 112 by catalytic reaction with air on the cathode catalyst to assist with cold starting of the fuel cell system 110. The amount of hydrogen that is needed at startup to purge the stack 112 can be calculated based on the volume of the anode side of the stack 112, the temperature of the stack 112, and the pressure within the stack 112. The hydrogen flow into the stack 112 should be roughly one anode volume. If an insufficient amount of hydrogen flows into the stack or a cell, some of the fuel cells might be left containing an $H_2/O_2$ front. The loop volume for the stack 112 is calculated and this information is combined with the hydrogen flow rate during the start-up to determine the purge time.

Figure 4A:
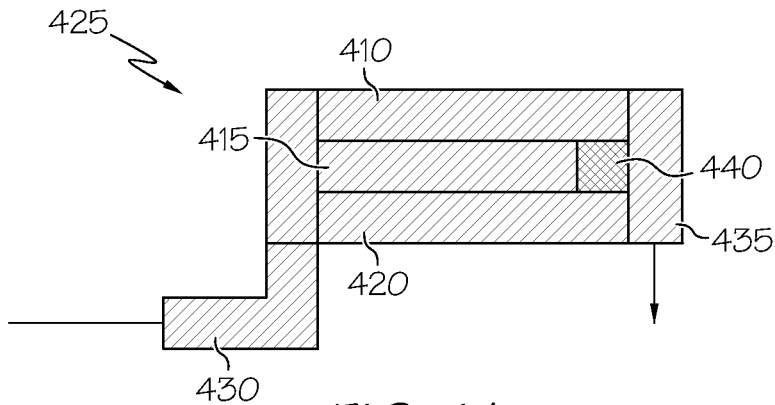
FIGS. 4A-E are an illustration of one embodiment of the start method of the present invention.
Figure 4B:
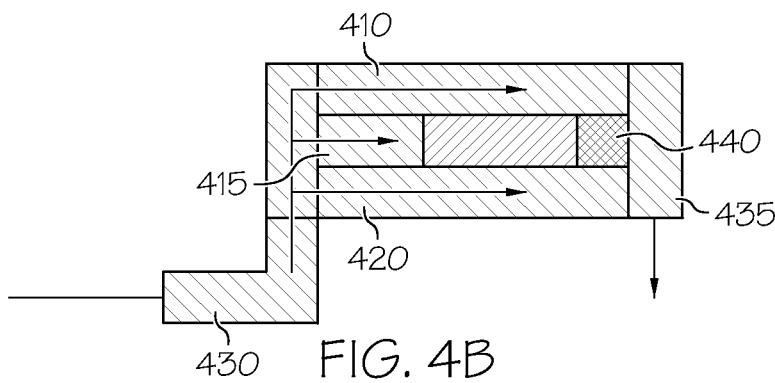
Figure 4C:
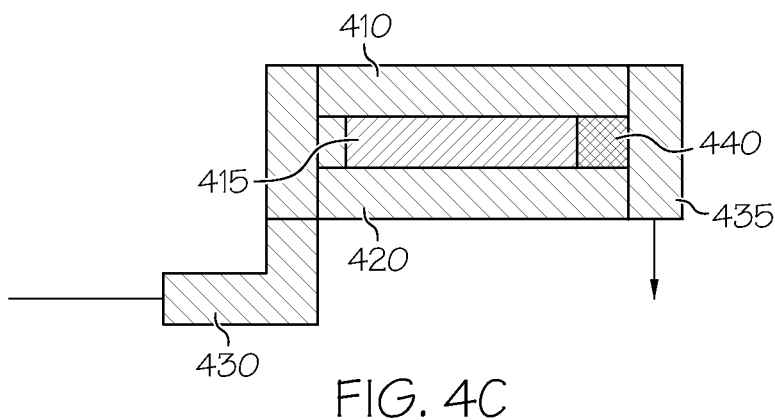
Figure 4D:
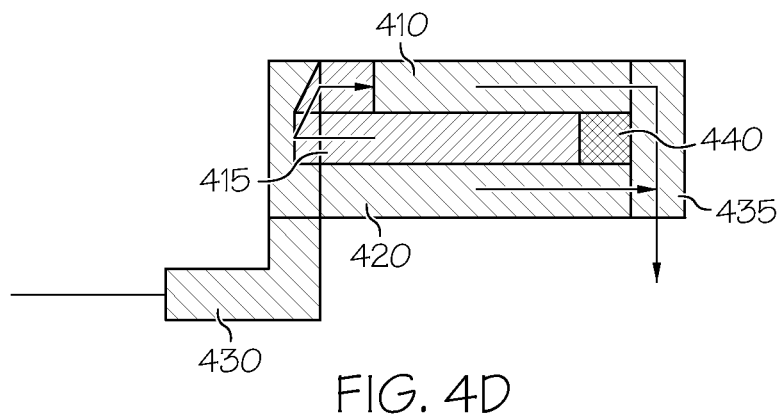
Figure 4E:
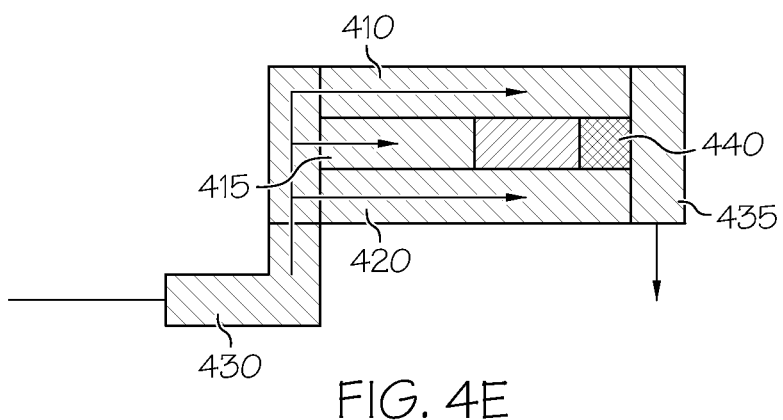

This decompression/recompression cycle is illustrated in FIG. 4A-E. In FIG. 4A, the anode channels 410, 415, 420 of stack 425 are filled with air and/or nitrogen. The stack includes an anode inlet 430 and a bleed valve 435. There is a blockage 440 in anode channel 415. In FIG. 4B, hydrogen is introduced into the anode inlet 430 and flows into anode channels 410, 415, 420. The compression of the gas pushes hydrogen even into the blocked anode channel 415. However, the blockage 440 in anode channel 415 prevents the hydrogen from filling anode channel 415. The operation of the stack consumes the hydrogen in the blocked cell, as shown in FIG. 4C, resulting in a voltage drop. In FIG. 4D, the pressure in the anode is reduced allowing some of the accumulated nitrogen (or other non-hydrogen) gas in the blocked cell to discharge from the inlet to channel 415 out into the other cells, where it can be discharged through bleed valve 435. In FIG. 4E the stack is repressurized with hydrogen, compressing hydrogen into the cells, including blocked channel 415. The cycle is repeated until all of the nitrogen (or other non-hydrogen) gas is removed from the blocked cell.

To prevent drying of the stack when the load is dropped, the cathode air flow can be reduced. This will also minimize the load on an auxiliary power supply. To exit from a blocked cell, some stack heating may be needed to thaw the ice. If an auxiliary heating source is available, it could be used to heat the stack.

During the cycle, the hydrogen delivered to the cathode could be used for catalytic heating of the stack, if desired. During the decompression, when the stack may not be able to carry load, or if the stack load is dropped for the entire cycle for load management, an auxiliary power source, such as a battery, would be needed to handle the compressor and other parasitic loads.

This mode of pressure cycling could be exited when the cell voltage recovers. To avoid reoccurrences of negative cell voltages and potential stack damage, the pressure cycling may be continued until the stack is above freezing to ensure that any ice blockages have melted.

If a cell were blocked at the anode inlet, the process would still work, but the blocked cell would be fed from the outlet. In this case, the initial compression would not bring much, if any, hydrogen into this cell due to the upstream volume, and recompression cycles would bring lower outlet hydrogen concentration and so would be consumed more quickly.

This method could be applied to a blocked cathode, if desired. However, this is not necessary as a blocked cathode is not damaging to the cell.

Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A method for starting a fuel cell, the method comprising:
   providing hydrogen to an inlet of an anode of the fuel cell to pressurize the anode to a pressure;
   measuring a cell temperature and a cell voltage of the fuel cell;
   determining from the cell temperature and the cell voltage whether a blocked cell condition exists, wherein the blocked cell condition comprises a blocked anode channel of the fuel cell having an ice blockage, and wherein the blocked cell condition exists when the cell voltage is negative and the cell temperature is below 0° C.;
   if no blocked cell condition exists, initiating a normal start sequence;
   if a blocked cell condition exists, alternately and in any order:
      reducing the pressure of the anode to discharge from the blocked anode channel any nitrogen or other non-hydrogen gas that remains in the blocked anode channel after the hydrogen has been consumed in the blocked anode channel by operation of the fuel cell; and
      increasing the pressure of the anode to compress hydrogen into the blocked anode channel,
   until an exit condition exists that ensures the ice blockage in the blocked anode channel has melted, wherein the exit condition exists when the cell voltage is stable and the cell temperature is greater than 0° C.; and
   when the exit condition exists, initiating the normal start sequence.

2. The method of claim 1, further comprising reducing a load on the fuel cell while reducing the pressure of the anode, or while increasing the pressure of the anode, or both.

3. The method of claim 1, wherein the pressure of the anode is reduced in less than 10 seconds and the pressure of the anode is increased in less than 5 seconds.

4. The method of claim 1, wherein increasing the pressure of the anode comprises increasing an anode pressure set point.

5. The method of claim 1, wherein increasing the pressure of the anode comprises opening a hydrogen supply valve.

6. The method of claim 1, further comprising heating the fuel cell while reducing the pressure of the anode, or while increasing the pressure of the anode, or both.

7. The method of claim 6, wherein the fuel cell is heated with an auxiliary heating source.

8. The method of claim 1, further comprising monitoring the voltage of the fuel cell to determine whether the voltage of the fuel cell is stable.

9. The method of claim 1, wherein the pressure of the anode is reduced before the pressure of the anode is increased.

10. The method of claim 1, wherein the pressure of the anode is increased before the pressure of the anode is reduced.

11. A method for starting a fuel cell having an anode with a blocked anode channel that contains an ice blockage, the method comprising:
    alternately, and in any order:
       increasing a pressure of the anode to compress hydrogen into the blocked anode channel; and
       decreasing the pressure of the anode to discharge from the blocked anode channel any nitrogen or other non-hydrogen gas that remains in the blocked anode channel after the hydrogen has been consumed in the blocked anode channel by operation of the fuel cell, until an exit condition exists that ensures the ice blockage in the blocked anode channel has melted, wherein the exit condition exists when a cell voltage of the fuel cell is stable and a cell temperature of the fuel cell is greater than 0° C.; and initiating a normal start sequence when the exit condition exists.

12. The method of claim 11, further comprising reducing a load on the fuel cell while reducing the pressure of the anode, or while increasing the pressure of the anode, or both.

13. The method of claim 11, further comprising opening an anode discharge valve while reducing the pressure of the anode.

14. The method of claim 11, wherein the pressure of the anode is reduced in less than 10 seconds and the pressure of the anode is increased in less than 5 seconds.

15. The method of claim 11, wherein increasing the pressure of the anode comprises opening a hydrogen supply valve.

16. The method of claim 11, further comprising heating the fuel cell while reducing the pressure of the anode, or while increasing the pressure of the anode, or both.

17. The method of claim 11, further comprising monitoring the voltage of the fuel cell to determine whether the voltage of the fuel cell is stable.

\* \* \* \* \*